June 28, 1927.　　　　　　　　　　　　　　　　　　1,633,803
F. A. BALLIN
DISHWASHING MACHINE
Filed Aug. 1, 1925
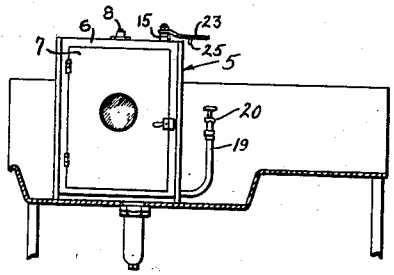
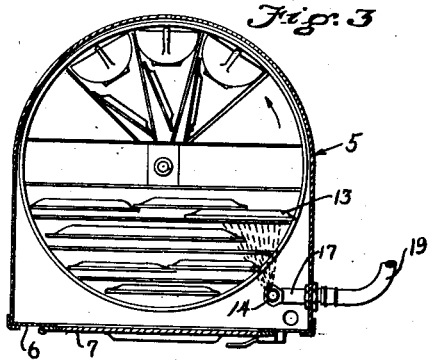
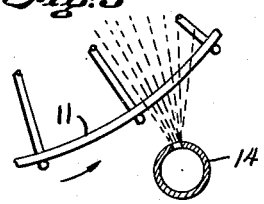
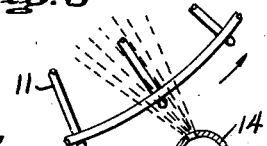
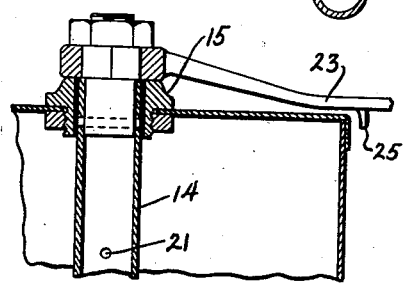
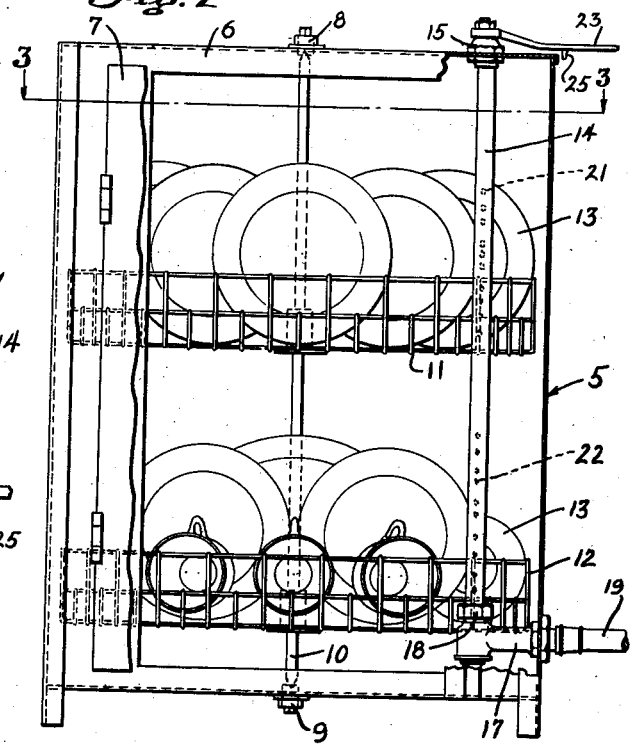
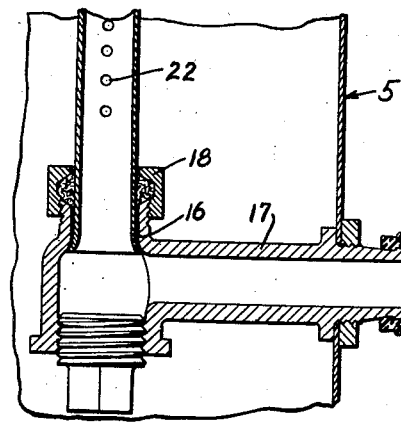
INVENTOR.
FREDERICK A. BALLIN
BY
ATTORNEY.

Patented June 28, 1927.

UNITED STATES PATENT OFFICE.

FREDERICK A. BALLIN, OF LOS ANGELES, CALIFORNIA.

DISHWASHING MACHINE.

Application filed August 1, 1925. Serial No. 47,402.

This invention relates to dish washing machines in which the rotary dish carriers are rotated by fluid impact.

An important object of the invention is to provide an apparatus in which the carriers containing the dishes are rotated by the impact of a stream of fluid directed against dishes, means being provided for accurately controlling the velocity of rotation.

Another object is to provide an apparatus in which the fluid for rotating the dish carrier baskets is utilized for cleansing the dishes.

Further objects and advantages will become apparent from the following specification, reference being had to the accompanying drawings, in which:

Fig. 1 is a side elevation of the apparatus showing the same connected to the water supply faucet of a kitchen sink.

Fig. 2 is an enlarged central vertical section through the apparatus, the dish carriers being in elevation, and dishes in place therein.

Fig. 3 is a transverse section of the apparatus taken on line 3—3 of Fig. 2.

Fig. 4 is an enlarged vertical detail section of the fluid directing mechanism.

Figs. 5 and 6 are diagrammatic plan views illustrating the method of directing the fluid jets against the dishes in the carriers for controlling their velocity of rotation.

I am aware that dish washing machines of the same general type have heretofore been employed for the cleansing of dishes, but such machines are generally provided with a dish carrier rotating means, such as an impeller wheel, driven by fluid impact, or an electric motor. While such machines have proven more or less successful, it has been ascertained from practical use that oftentimes the rotating dish carriers when the dishes are disposed unequally therein attain such high speed that oftentimes such dishes and glassware are broken by the centrifugal action generated by the revolving carriers, no means being provided for regulating their speed of rotation.

By means of the construction herein illustrated and described the speed of the revolving dish carriers can be instantly and readily regulated, and moreover as the dish cleansing fluid performs the dual function of cleansing the dishes and rotating the carriers no special rotating means such as impeller wheels or motors are needed, thus effecting an important economy in construction.

Briefly the apparatus which is here illustrated as portable consists of a casing provided with a door for access thereto, and mounted on a centrally disposed spindle are a pair of wire dish carriers disposed one above another and arranged so that the dishes, especially the plates when mounted therein will be disposed in such planes that the same will function in the same manner as the vanes of an impeller wheel, the plates and other articles being exposed to a plurality of impacting jets of water by which they are thoroughly cleansed.

Vertically disposed in one corner of the casing is a fluid supply pipe provided with a plurality of fluid discharge openings, the pipe at its lower end being connected to a flexible water inlet pipe that is adapted to be connected to the faucet of a kitchen sink. By means of a lever at the upper end of the discharge pipe the direction of impact of the water jets issuing through the discharge openings can be readily and quickly controlled.

Referring now more particularly to the drawings, 5 designates a sheet metal casing having a discharge outlet the front and side walls being flat while its rear wall is semicylindrical. The front wall 6 is provided with a door 7 to provide access to its interior. Mounted in suitable bearings 8, 9, in the top and bottom walls is a vertically disposed shaft 10, to which is suitably secured a pair of wire circular dish carriers 11, 12, spaced a suitable distance apart to permit of a ready insertion or removal therefrom of the dishes and other articles to be cleansed. The flexible wires forming the tops of the carriers may be arranged in any suitable manner, but preferably in the form shown in Fig. 3 so that the plates 13, or other dishes having broad flat surfaces will be disposed in such planes as will effect a ready rotation of the carriers when jets of water are impacted thereagainst.

The carrier rotating and dish cleansing means preferably consists of a vertically disposed pipe 14, the upper end being rotatively secured in bearing 15 formed on the wall of the casing, while its lower swaged end engages the opening 16 of fitting 17, the opening being provided with a packing gland 18 of usual form to prevent leakage when the machine is in operation. The inlet end of the fitting 17 extends through the adjacent side wall of the casing, its end being engaged by a flexible hose 19 that may be in turn connected to a source of fluid supply, such as the faucet 20 of a kitchen sink. Pipe 14 is provided in its wall with a plurality of vertically arranged perforations arranged in groups 21, 22, each group being disposed in line with the dish carriers, as clearly shown in Fig. 2. Secured to the upper end of pipe 14, is a handle or lever 23 for rotating the pipe so as to change the direction of fluid discharge issuing through the pipe perforations, whereby the velocity of rotation of the dish carriers may be readily and easily controlled. In Fig. 5 the pipe 14 is turned so that the jets of water issuing through the perforations are delivered at such angle to the dishes as will cause the carriers to be rotated at their maximum speed, while in Fig. 6 the pipe is shown as turned to a position to direct the jets radially against the dishes in the carriers and thus impart little or no motion thereto, the intermediate positions of the pipe 14 between these two extreme positions determining the velocity of the rotation of the dish carriers.

Formed integral with the outer end of lever 23, is a downwardly extending lug 25 designed to engage one of the side walls of the casing to limit the rotation of the fluid supply pipe in either direction, and thus control the speed of rotation of the carriers.

From the above description it will be apparent that I have provided a comparatively simple mechanism for the cleansing of dishes and other articles in which the cleansing streams are utilized for rotating the dish carriers, and as the jet means can be disposed at any desired angle to the dishes in the carriers their velocity of rotation can be easily and readily controlled without regar  to the distribution of the dishes in said carriers.

Further, as the water jets are directed against the dishes it will be seen that the same are cleaned by fluid impact, such method resulting in a thorough cleansing operation.

What I claim is:

1. A dish washing machine comprising a casing having in its front wall an opening and closure therefor, said casing having a fluid discharge outlet, a vertically disposed shaft mounted in bearings formed on the top and bottom walls of said casing, a plurality of dish carriers spaced apart mounted on said shaft, and a fluid discharge pipe vertically disposed in said casing having a plurality of fluid discharge outlets, said outlets discharging fluid against the dishes in the carriers to rotate and cleanse the same, and means to rotate said discharge pipe to change the direction of the jets of water issuing through the discharge outlets formed therein, whereby to increase or diminish the velocity of rotation of the carriers or to reverse their direction of rotation.

2. A dish washing machine comprising a casing having in its front wall an opening and closure therefore, dish carriers one above another mounted for rotation in said casing, a vertically disposed fluid discharge pipe mounted in said casing having a plurality of fluid discharge outlets, said outlets discharging fluid against the dishes in the carriers to rotate and cleanse the same, and manually operated means secured to the upper end of said discharge pipe without the casing to rotate the discharge pipe on its axis to change the direction of the jets of water issuing through the discharge outlets to control the speed and direction of rotation of said carriers.

3. A dish washing machine comprising a casing having in its front wall an opening and closure therefore, dish carriers mounted for rotation in said casing one above another, a flexible fluid supply pipe connected to said casing, a vertically disposed fluid discharge pipe having a plurality of discharge outlets rotatably connected to the fluid supply pipe, its upper end being closed and rotatably connected to the top wall of said casing, said outlets discharging fluid against the dishes in said carriers to rotate and cleanse the same, and a handle on the upper end of said discharge pipe to rotate the same to change the angle of the discharge outlets with respect to said carriers to reverse their direction of rotation.

I have hereunto subscribed my name this 24th day of July, 1925.

FRED A. BALLIN.